(12) United States Patent
Battlogg et al.

(10) Patent No.: US 8,985,149 B2
(45) Date of Patent: Mar. 24, 2015

(54) ADJUSTABLE VALVE WITH A TRANSITION REGION

(75) Inventors: Stefan Battlogg, St. Anton Im Montafon (AT); Juergen Poesel, Bludenz (AT); Gernot Elsensohn, St. Anton Im Montafon (AT)

(73) Assignee: Inventus Engineering GmbH, St. Anton Montafon (AT)

( * ) Notice: Subject to any disclaimer, the term of this patent is extended or adjusted under 35 U.S.C. 154(b) by 141 days.

(21) Appl. No.: 13/386,107

(22) PCT Filed: Jul. 20, 2010

(86) PCT No.: PCT/EP2010/004420
§ 371 (c)(1),
(2), (4) Date: Jan. 20, 2012

(87) PCT Pub. No.: WO2011/009586
PCT Pub. Date: Jan. 27, 2011

(65) Prior Publication Data
US 2012/0119123 A1 May 17, 2012

(30) Foreign Application Priority Data
Jul. 21, 2009 (DE) .......................... 10 2009 034 297

(51) Int. Cl.
*F15B 21/00* (2006.01)
*F16F 9/53* (2006.01)
*F16F 9/46* (2006.01)

(52) U.S. Cl.
CPC . *F16F 9/535* (2013.01); *F16F 9/46* (2013.01); *Y10S 137/909* (2013.01)
USPC ...... 137/807; 137/827; 137/909; 251/129.01; 251/129.06; 188/267

(58) Field of Classification Search
CPC ............. F16F 9/53; F16F 9/532; F16F 9/535; F16F 13/30; F16F 13/305
USPC .................. 137/807, 827, 842, 909; 188/267, 188/267.1, 267.2; 251/129.01, 129.06
See application file for complete search history.

(56) References Cited

U.S. PATENT DOCUMENTS 3,599,428 A * 8/1971 Chaney et al. .................. 60/326
4,463,502 A * 8/1984 Fitzgerald et al. .............. 34/249

(Continued)

FOREIGN PATENT DOCUMENTS

DE 698 06 100 T2 12/2002
DE 102 14 357 A1 10/2003

(Continued)

OTHER PUBLICATIONS

German Patent and Trademark Office Search Report, dated Aug. 13, 2009.

*Primary Examiner* — Matthew W Jellett
(74) *Attorney, Agent, or Firm* — Laurence A. Greenberg; Werner H. Stemer; Ralph E. Locher

(57) ABSTRACT

A valve device is formed with a through-channel and a field generating device. A fluid which can be influenced by a field is provided in the through-channel and the field generating device is configured to act on the field-influenced fluid in the through-channel by way of a field. At least one adjustment device is provided with which the field that is active in the through-channel can be adjusted. A portion of the cross-sectional area of the through-channel can be adjusted, the portion being exposed to a field of a specific intensity so that the through-channel can also only partly be exposed to a field of a specific intensity. Thus, the through-channel, as seen in the direction of the flow, can be divided into regions of different flow resistance, whereby characteristic curves, which were previously attained only with difficulty, are easily obtained when using the valve device in a damper, for example.

19 Claims, 6 Drawing Sheets

(56) References Cited

U.S. PATENT DOCUMENTS

| | | | |
|---|---|---|---|
| 5,241,991 A * | 9/1993 | Iorio et al. | 137/807 |
| 5,907,880 A | 6/1999 | Durazzani et al. | |
| 6,095,486 A * | 8/2000 | Ivers et al. | 251/129.01 |
| 6,131,709 A | 10/2000 | Jolly et al. | |
| 6,158,470 A * | 12/2000 | Ivers et al. | 137/807 |
| 6,279,701 B1 * | 8/2001 | Namuduri et al. | 188/267.2 |
| 6,340,080 B1 * | 1/2002 | Carlson | 188/267.2 |
| 6,471,018 B1 * | 10/2002 | Gordaninejad et al. | 188/267.1 |
| 6,740,125 B2 * | 5/2004 | Mosler | 623/45 |
| 7,225,905 B2 * | 6/2007 | Namuduri et al. | 188/267.1 |
| 7,303,056 B2 * | 12/2007 | Namuduri | 188/267.2 |
| 7,686,143 B2 * | 3/2010 | Namuduri | 188/267.2 |
| 7,958,979 B2 * | 6/2011 | Sekiya et al. | 188/267.2 |
| 8,418,819 B2 * | 4/2013 | Battlogg et al. | 188/267.2 |
| 8,453,806 B2 * | 6/2013 | Battlogg et al. | 188/267 |
| 8,485,324 B2 * | 7/2013 | Walthert et al. | 188/267.2 |
| 2005/0087408 A1 * | 4/2005 | Namuduri et al. | 188/267.1 |
| 2005/0121269 A1 * | 6/2005 | Namuduri | 188/267.1 |
| 2007/0045068 A1 * | 3/2007 | Namuduri et al. | 188/267 |
| 2009/0294231 A1 * | 12/2009 | Carlson et al. | 188/267.2 |
| 2010/0199519 A1 * | 8/2010 | Battlogg | 36/83 |
| 2011/0127706 A1 * | 6/2011 | Sims et al. | 267/221 |
| 2012/0186922 A1 * | 7/2012 | Battlogg et al. | 188/267.1 |
| 2012/0313020 A1 * | 12/2012 | Battlogg et al. | 251/65 |

FOREIGN PATENT DOCUMENTS

| | | |
|---|---|---|
| DE | 698 21 799 T2 | 1/2005 |
| DE | 103 37 516 A1 | 3/2005 |
| DE | 698 30 655 T2 | 5/2006 |
| JP | 59017039 A | 1/1984 |
| WO | 99/58873 A1 | 11/1999 |
| WO | 2010/015647 A1 | 2/2010 |

* cited by examiner

ADJUSTABLE VALVE WITH A TRANSITION REGION

BACKGROUND OF THE INVENTION

Field of the Invention

The present invention relates to an adjustable valve which is able to influence the flow of magneto-rheological or electro-rheological fluids (MRF or ERF). The medium traversing the valve is influenced by means of a magnetic or electrical field.

The viscosity of the fluid can be modified by forming chains of ferromagnetic particles or small dipoles in the region of the field. The viscosity in the field region is usually clearly increased in this way in relation to regions outside the field.

The fluid reacts very rapidly to field changes, within the range of a few ms and below, which is why valves can be adjusted very rapidly in accordance with this concept. A further advantage of such valves is that the adjustment can take place without moved mechanical parts.

The present invention is described by way of the example of a valve for magneto-rheological fluids, however it is applicable in an analogous manner to all fluids, the rheological properties of which are field-dependent.

Magnetic fields can be generated by permanent magnets or electromagnets, i.e. current-carrying coils. DE 698 21 799 T2, where different concepts for influencing a through-channel by a magnetic field of a permanent magnet are shown, can be named here as the prior art.

In the case of certain applications, it can be a disadvantage for the entire through-channel to be traversed by a magnetic field. If a valve is to be inserted in this manner, for example, in a damper, the result is a "breach" as soon as the force onto the piston in the damper exceeds a specific value. Dependent on the magnetic field set, a certain "break-free force" has to be exceeded initially if the piston is to be accelerated from the standstill position. This break-free force is generated by the shear stress of the MRF, the flow behavior of which in the magnetic field can be described by the Bingham model.

In order to circumvent this problem, solutions with one or several bypasses are known, such as, for example, as shown in WO 99/58873. A bypass, which does not lie within the magnetic field, bridges the valve in parallel with the through-channel. The MRF behaves as a Newton fluid in this bypass, i.e. the MRF is able to be moved without shear stress.

If, for example, the compression-speed development of a damper with an MRF valve and bypass is recorded, at low speeds the MRF flows exclusively through the bypass. As the speed increases, the pressure loss in the bypass increases until this pressure difference reaches a critical value Pkrit, corresponding to the shear stress of the MRF in the through-channel. Upward of this pressure, the MRF flows through the bypass and the through-channel, which is why as the speed increases further, the pressure rises less steeply than before.

In the case of some applications, this break at Pkrit in the compression-speed development cannot be tolerated. For example, in the case of shock absorbers on a bicycle, a smooth transition from the "low speed" to "high speed" range is very important, the break point in the compression-speed development has to be strongly rounded. Only then does a damper distinguish itself by a high level of driving comfort and increased safety provided by better road contact.

In the case of purely mechanical systems, spring-loaded valves can be used at the bypasses to generate the desired damping characteristics (for example WO 99/58873, FIG. 3a).

The influencing of an MRF valve by means of electrical coil arrangements, which regulate the magnetic field intensity in the through-channel by controlling the coil current in a suitable manner, such as, for example, in DE 103 37 516 A1, is equally a prior art. With corresponding expenditure on sensors and control, any arbitrary curve within the operating range of the damper can be actuated with an electric valve.

The electric solution always requires current, which calls for a correspondingly dimensioned power supply, as the power requirement can be very large depending on the operating range of the damper. In addition, the demands on the sensor technology and the control are extremely high as the adjusting of the field has to take place in quasi real time.

BRIEF SUMMARY OF THE INVENTION

The object of the present invention is to make available an adjustable valve for MRF or ERF, said valve being developed in such a manner that the damping characteristics necessary, for example, for an application as a damper on a bicycle are achieved without any special expenditure. The compression-speed characteristic of the valve, which is adjustable over a wide range, is able to be adjusted simply in comparison to non-electric solutions as claimed in the prior art and by modifying the magnetic field even without direct mechanical contact in the pressurized interior of the valve.

This is possible through a valve as claimed in claim 1, where at least one through-channel is traversed only in a partial manner by the field. In this case, the field has a gradient which is oriented transversely with respect to the direction of flow of the fluid. The gradient of the field can, in particular, also be transverse with respect to each local direction of flow. The gradient can be oriented substantially perpendicular or normal with respect to the direction of flow of the fluid. The important factor is that different regions of a cross section can have variously strong fields. This means that the resistance of the flow path of individual particles can differ from the resistance of adjacent flow paths. The resistance of different flow paths through the cross section of the valve can differ preferably by more than a factor of ten and in particular of one hundred from each other.

The result is that the through-channel is divided thereby—viewed electrically (ERF) or magneto-rheologically (MRF)—into three regions/zones. In the case of a cross section through the valve, the cross sectional area of the through-channel can be divided into the following regions, it being possible, however, for individual regions to occur repeatedly: a blocking region which lies completely in the magnetic field, a transmission region which lies outside the magnetic field and a transition region which lies between the transmission region and the blocking region. The transmission region corresponds to the bypass located outside the magnetic field and the blocking region corresponds to the through-channel which is completely acted upon magnetically as claimed in the prior art. This separation is effected not by mechanical boundaries but corresponds to a virtual division by way of the prevailing field intensities. However, it is also possible that different through-channels are acted upon by different fields in order to provide a strongly non-homogenous field over a cross section.

The transition region which is mainly formed by stray magnetic fields is new. In said transition region, the magnetic field is effective with increasing intensity in the direction of the blocking region, however with no or only little field in the transition to the transmission region. If the magnetic field intensity is increased, the way in which the region is divided magnetically alters, i.e. the blocking region becomes greater and the bypass region smaller.

In the compression-speed diagram, the behavior of a valve constructed in this manner shows that the MRF flows only in the "open" transmission region if the speeds are very slow. As the speed of flow increases, the pressure difference of the valve increases until the corresponding shear stress of adjoining MRF chains is reached in the transition region and they are carried forward. As the flow speed increases, the transmission region consequently enlarges at the cost of the transition region. The bypass is thereby no longer mechanically restricted, but rather is dependent on the flow speed and the stray magnetic field (and their resultant chain formation in the MRF).

As the flow speed increases even more, the transmission region is expanded further until it has occupied the transition region in its entirety. Even faster speeds cause the blocking region to be breached, the MRF then flows in the entire through-channel. Determined by the transition region, the breach is effected, however, as a flowing transition. Depending on the transition region, the compression-speed characteristic of such a valve can show a gentle transition to the breach region.

The procedure is completely reversible, as the flow speed falls, the MRF flow comes to a standstill in the blocking region and the transition region is able to be built up again.

An essential feature of the invention is that the field generating unit is able to generate a non-homogeneous field. In this case, the field is to be substantially transverse with respect to the direction of flow or even normal along the direction of the flow of the fluid in order to be able to realize the described regions. The described effect cannot be achieved with one field that is non-homogeneous only in the direction of flow, the valve behaves identically as a valve with a completely identically formed field with a specific intensity.

The non-homogeneity of the field causes the portion of the cross sectional surface, which is exposed to an under-averagely or to an over-averagely intense field, to be adjustable. In this case, the maximum or minimum field intensity effective in the cross section does not have to be modified, rather the cross sectional portion via which the field intensity falls from the maximum to the minimum value is modified.

By realizing different regions, a valve as claimed in the invention is able to prevent the flowing of the fluid completely, only allow it in a part region or even allow it in the entire through-channel as a function of the magnetic field and the pressure difference. A valve as claimed in the prior art can only control the through-channel as a whole: it either blocks the flow or it allows it (with flow resistance that is dependent on the average field intensity).

The transmission region corresponds to a (variable) leakage or to a (variable) bypass and the transition region corresponds to a weak point of a conventional valve, which is why such field regions have usually been avoided up to now. The present invention varies and utilizes these regions in a targeted manner as an adjustment possibility in order to be able to achieve particularly advantageous valve characteristics in a simple manner.

In contrast to the prior art, in the case of the present invention the use of additional bypasses or spring-loaded valves can, as a rule, be dispensed with. This means that a valve in the design of this invention is constructed in a very reliable and sturdy manner. The simple design also makes it possible to save on installation space and weight and to produce the valve in a cost-efficient manner.

A further advantage is that a valve in the manner of this invention can react very rapidly to pressure peaks. Only the inertness of the fluid itself limits the reaction time, response times of mechanical components do not apply at all. A pressure peak appearing suddenly can be diverted via the entire through-channel, that is to say via the transmission, transition and blocking region, as all MRF chains are carried forward. As soon as the overpressure is diverted, the initial state of the valve is immediately resumed. This means that an overpressure device that would otherwise be necessary, is able to be omitted.

A modification of the compression-speed characteristic of the valve over a large region simply involves one modification of the magnetic field. This means that an adjustment can be performed at the valve without having to produce a mechanical connection in the interior of the pressurized valve. Seals for this can consequently be omitted.

One development of this invention shows the application in a rear wheel damper of a bicycle. This illustrates that new operating concepts are possible as a result of the non-contact adjusting possibilities of the valve. Having the adjusting rings mounted centrally on the damper means that the ergonomy can be clearly increased as, when the damper is installed in a conventional manner, they are easier to reach and by their size are easier to operate than in the case of dampers as claimed in the prior art.

If a valve as claimed in the present invention is operated electrically, the better adaptation to the operating range provides the possibility to fit very efficiently operating valves which, compared to the prior art, require less power. In addition, the sensor technology can be simplified or can be completely omitted and the demands on the control system are clearly reduced.

This is possible as the curve shape is quasi system-inherent as a result of the shape of the magnetic field in the valve and the control system has to engage simply when the curve shape changes. These changes can be executed, however, completely independently of the current speed, pressure, position or other conditions, which is why sensors can possibly be omitted.

In addition, in combination with a permanent magnet, the basic magnetic field can be adapted to the application such that electric power is required only when changes are made to the basic state. Only intensity and/or the development of the magnetic field, proceeding from the basic magnetic field, are also varied by means of the coil, which can result in clear energy savings.

The device as claimed in the invention includes a valve for MRF or ERF, which has at least one through-channel in which the rheological properties of the fluid can be modified by a corresponding field.

In addition, the device includes a field generating unit which generates a variable magnetic or electric field at least in part regions of the through-channel. Characteristic, in this case, is that, when viewed in the direction of flow of the fluid, regions of the through-channel are not traversed or are traversed less by the field than other regions.

A permanent magnet preferably serves as the field generating unit, however, several permanent magnets, one or even several electric coils or a combination of permanent magnets and coils can be used.

In order to be able to vary the magnetic field even with permanent magnets, it is advantageous to develop said permanent magnets so as to be displaceable. In this case, they can be displaced laterally in relation to the through-channel by means of a longitudinal displacement or a rotational movement or the distance to the through-channel can be modified.

It is also conceivable for the magnetic field to be influenced at least in a partial manner by means of pole pieces made of ferromagnetic material. In this case, for example by means of consciously producing appearances of saturation, the magnetic field can be weakened or reshaped. The same effect can also be produced by magnetic jumpers made of ferromagnetic material or also by means of magnetic insulation brought about by materials that are not magnetically conductive or are badly magnetically conductive.

The aim of this measure is to vary the shape and/or intensity of the magnetic field in the through-channel transversely with respect to the direction of flow and to be able to divide the channel into the transmission, transition and blocking region. This results, once again, in the specific compression-speed characteristic of a valve, which depends directly on the magnetic field and consequently, once again, on the position of the magnet or of the above-described field-forming elements.

In order to be able to reinforce the effect of the transition region, several transition regions and/or bypass regions can also be used. This is possible as a result of a chamber-like development of the pole faces at the through-channel. These focus the lines of flux towards local peaks and thin out the field in between. Transition regions are situated between regions with maximum field intensity and regions with minimum intensity. Regions with hardly any or minimum field intensity are bypass regions.

The valve device as claimed in the invention includes at least one through-channel or flow channel, as well as one field generating unit, a fluid that can be influenced by a field being provided in the through-channel and the field generating unit being designed to act on the fluid, which can be influenced by a field, in the through-channel by a field. At least one adjusting device is provided, by way of which the field that is effective in the through-channel is adjustable. In addition, at least one portion of the cross sectional area of the through-channel is adjustable, said portion being exposed to a field of specific intensity, such that the through-channel is also able to be exposed in an only partial manner to a field of a specific intensity.

Another valve device preferably includes a through-channel as well as a field generating unit, a fluid that can be influenced by a field being provided in the through-channel and the field generating unit being designed to act on the fluid, which can be influenced by a field, in the through-channel by a field. In this case, the through-channel, when viewed transversely with respect to the direction of flow, has a transition region and at least one blocking section that merges therein and/or at least one transmission section that merges therein. The individual regions, in this case, extend substantially parallel to the direction of flow.

The field is not effective at all or only very little in the transmission section. At least one transition region borders on the operative section and/or the bypass section.

At least one transition region preferably borders on the operative section and/or the bypass section.

The valve device can have at least one adjusting device, by way of which the field that is effective in the through-channel is adjustable. An adjusting device in terms of this invention can operate mechanically and/or electrically and is able to influence the field along the damping channel by means of a mechanical and/or electric adjustment.

At least one portion of the through-channel is preferably adjustable, said portion being exposed to a field of a specific intensity such that the through-channel is able to be exposed also in an only partial manner to a field of a specific intensity.

Using the adjusting device in the case of the valve device, the surface portion of the cross sectional area of the through-channel and/or the volume portion of the through-channel on which a field of a specific intensity acts, can be adjustable. The separation of the portion from other regions is effected along the direction of flow by way of the field intensity, which has to be non-homogeneous over the cross section of the through-channel.

The cross sectional area of the through-channel is composed of the cross sectional areas of the blocking section, the transmission section and the transition region. The transition region, in particular, is adjustable.

The intensity of the field acting on the through-channel is preferably adjustable.

The field generating device includes, in particular, a magnetic device in order to generate a magnetic field as the field. In an advantageous manner, the fluid that can be influenced by a field includes at least one magneto-rheological fluid.

The magnetic device can include at least one permanent magnet.

The adjusting device can include at least one longitudinally displaceable adjusting element and/or at least one rotational device. The rotational device can include at least one permanent magnet. The adjusting device can also consist of at least one permanent magnet and a coil or also of several coils, these do not have to be movable. The magnetic field, in this case, can be adjusted via the current in at least one coil.

At least one rotational unit is preferably provided on the outer side of a valve housing. A control valve can be provided.

The adjusting of the flow channel or through-channel is preferably effected only by means of the magnetic field without direct mechanical contact. The field is effective in particular through the magnetic field and through the valve housing.

The portion of the through-channel which is not exposed to a field and consequently acts as a bypass section is modifiable in particular by means of an adjusting device.

The portion of the flow channel which is exposed to a partial field, i.e. the transition region from the weakest to the strongest region of the magnetic field, is preferably modifiable.

Several transition regions can be generated in the flow channel by several pole pairs of the magnetic device. The following figures show the fundamental principles and some advantages of this invention and represent exemplary embodiments of the application as claimed in the invention.

In this case:

DESCRIPTION OF THE INVENTION

Figure 1:
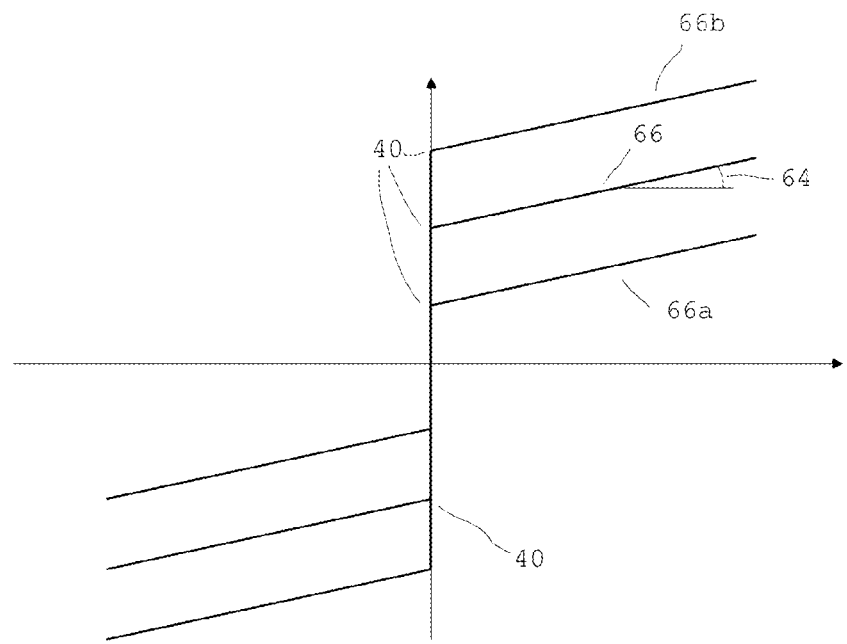
FIG. 1 shows the characteristic of an MRF valve at different field intensities.
Figure 2:
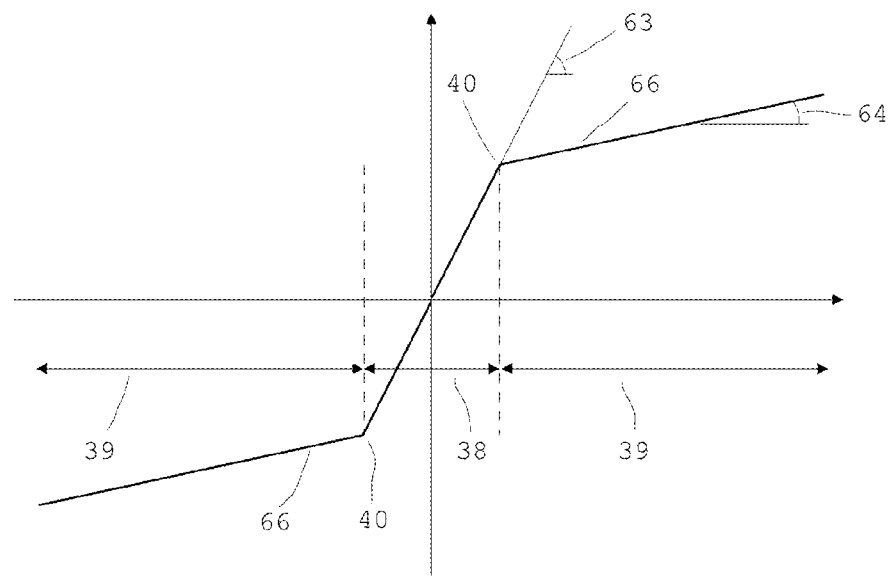
FIG. 2 shows the characteristic of an MRF valve with a bypass at a specific field intensity.
Figure 3:
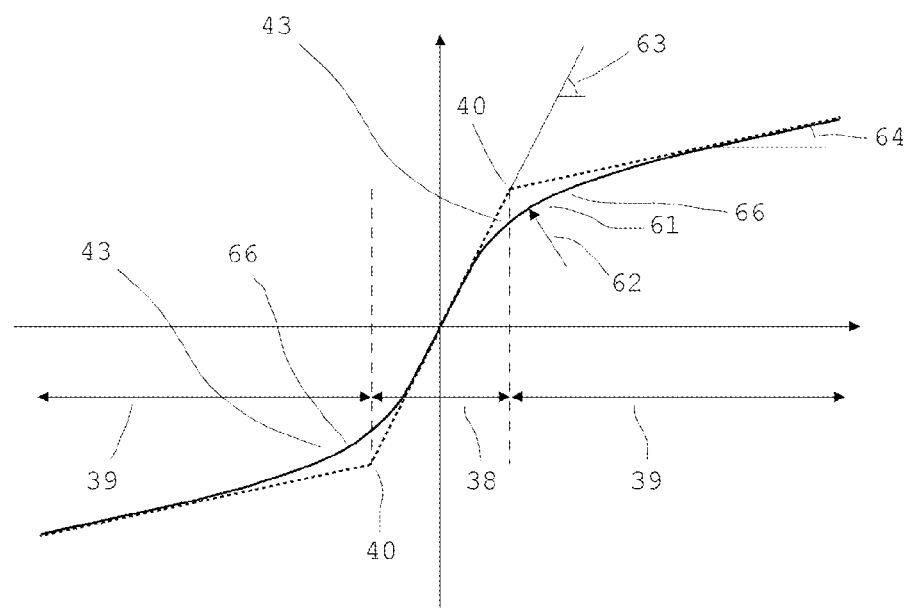
FIG. 3 shows the characteristic of an MRF valve as claimed in the invention with a transition region.

FIGS. 1 to 3 shows characteristics 66, 66a and 66b (compression-speed developments) of different designs of an MRF valve 4. The force of the valve 4 is also able to be applied in an analogous manner to the pressure, for example the counter force onto the piston 18 when the valve is used as a damper 22 or in a damper 1. The speed represents the rate of flow of the flowing fluid as the sum of all possible individual flows or the traveling speed of the piston 18 in the case of the damper 22.

In FIG. 1, the entire through-channel 6 of the valve 4 is penetrated by a homogeneous magnetic field 44. Depending on the intensity of the magnetic field, shear stress is present which has to be overcome so that the fluid is able to flow. Below this "break-away force", no flow is possible and the valve therefore closes completely. Break points 40 and ascents 64 of the (valve) characteristic 66 are produced in both directions of flow. By means of a stronger magnetic field, the line 66 can be displaced upward approximately parallel (line 66b) or downward to the characteristic 66a.

It is characteristic of such a valve that pressure can be built up even without flow. This valve geometry is usually used when the field is generated by coils.

FIG. 2 shows the characteristic 66 of an MRF valve 4 with a bypass. In this case, the bypass is not developed so as to be variable by additional elements such as spring-loaded valves, but is constantly open as in the case of typical applications, for example, in the automotive sector.

The bypass enables zero passage, with which no pressure is able to be built up either without fluid flow or piston movement. The bypass determines the curve development 66 in the low speed range 38, from a certain pressure Pkrit at the break point 40 the fluid flows through the bypass and the through-channel 6 and the curve runs flatter. The pressure, at which this transition takes place, corresponds to the pressure which the MRF can withstand in the through-channel 6 on account of the shear stress produced by the magnetic field.

Depending on the design and on the enlargement factor of the examination, the curve development 66 can have a light rounding at the break point 40, said rounding being generated by "interference factors" such as, for example, non-homogeneities in the field, inertia in the design etc. In the low speed range 38, the characteristic 66 extends with an ascent 63, whilst the ascent 64 is flatter in the high speed range 39, as both the bypass and the through-channel are traversed.

Roundings in the curve development as in FIG. 2 are, however, insignificant in any case in comparison with the curve developments according to FIG. 3. FIG. 3 shows a possible preferred development of the characteristic 66 of the MRF valve 4. The marked transition region 43 with the rounding 61, which has a radius 62, can be clearly seen.

Such curve developments can be reached, in principle, even with valves where the bypass is mechanically modified in a speed-dependent manner or the coil current of an electromagnet is adapted. To this end, however, expensive analysis in real time in the microsecond or millisecond range is necessary. The generating of these curve developments as claimed in the invention, however, is linked to clearly less expenditure and requires no real time analysis.

The generating of the curve developments as in FIG. 3 is explained with reference to the schematic representation in FIG. 4.

Figure 4:
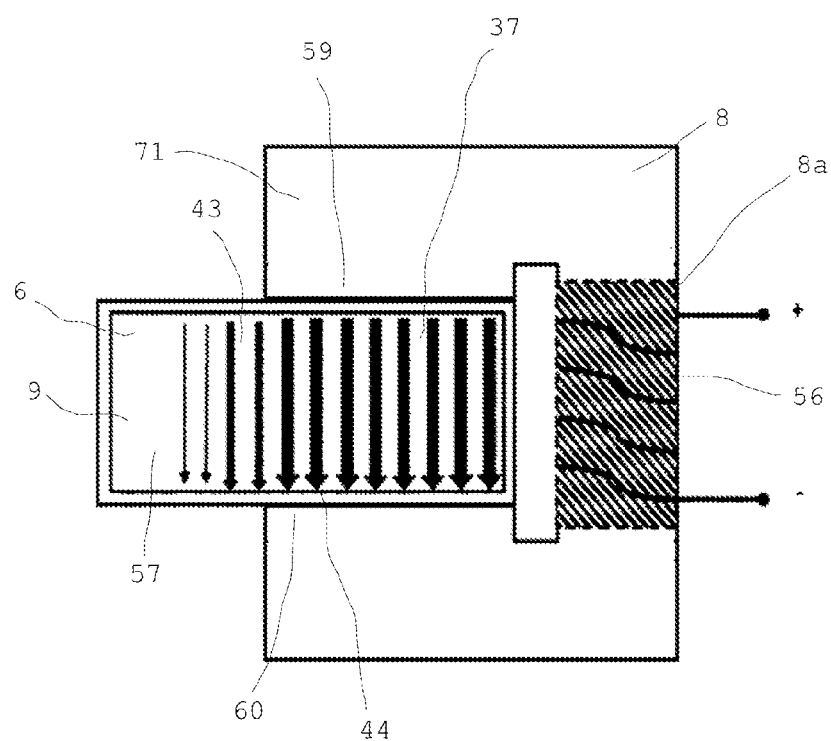
FIG. 4 shows a schematic representation of an MRF valve with a transition region.

FIG. 4 shows the schematic design of an MRF valve 4 which is operated with a magneto-rheological fluid 9 and has a transition region 43. The cross section through a through-channel is shown, the direction of flow through the valve is transverse and in this case is oriented perpendicularly with respect to the section shown. A magnetic field 44 is generated in the C-shaped iron core 71 by means of coil 56 or by means of a permanent magnet 8a incorporated into the core. The magnetic flux lines close the magnetic circuit over the through-channel 6 lying between the poles.

All the elements of the valve participating in the generating and guiding of the magnetic field are referred to as magnetic device 8. These can include, for example, the iron core 71, the poles 59, 60, a coil 56 and/or a permanent magnet 8a.

The region of the channel 6, which lies between the poles 59, 60, is usually penetrated by a relatively homogeneous magnetic field 44 and provides the blocking section 37 of the through-channel 6. The region of the through-channel, which lies to the side next to the poles, is penetrated by a stray magnetic field that reduces outward and provides the transition region 43. The size of the transition region 43 is determined by the intensity and shape of the stray magnetic field, which depends, in its turn, mainly on the geometry of the channel and of the poles, the intensity of the magnetic field 44 and the materials used (the permeability thereof).

Right at the outside, in the region of the through-channel 6 at the greatest distance to the poles, there is no magnetic field present or only a very small stray field. This is the transmission section 57, in which the fluid 9 is able to flow in a manner that is extensively independent of the magnetic field. The magnetic field in the transmission section 57 is smaller, in particular by a factor of 10 and preferably a factor of 100, than that in the operative region or blocking section 37.

In the center of the transmission section 57 a first field or magnetic field with a first average value is effective. In the center of the transition region 43 a second field with a second average value is effective and in the center of the blocking section 37 a third field with a third average value is effective. The third average value is greater than the second average value and the second average value is greater than the first average value. In this case in the exemplary embodiment, the second average value is at least ten times greater than the first average value. The third average value is at least ten times greater than the second average value.

The field in the transition region 43 is strongly non-homogeneous, such that the ratio between the greatest field value and the smallest field value within the transition region 43 is greater than ten and preferably greater than one hundred.

From the diagram it can be seen that when the magnetic unit 8 is displaced to the side in relation to the through-channel 6, the ratio between the three part regions 37, 43, 57 changes in an aliquot manner or in a proportional manner.

In an analogous manner, the magnetic unit 8 can be omitted and electrodes can be used in place of the poles when the principle of the transition region 43 is to be applied to ERF.

If the path of individual particles through the valve 4 shown is imagined as flow paths, the difference to a valve as claimed in the prior art becomes clear: the flow resistance of a flow path, dependent on the respectively prevailing magnetic field 44, can differ from the resistance of adjacent flow paths. Depending on the field and the pressure difference, only a part region of the available cross section is traversed. In the representation in FIG. 4, at a certain pressure, the greatest flow speed would prevail on the outside left in the through-channel, the flow resistance in the region of the transition region, however, would reduce towards the blocking section. In the blocking section the fluid will behave like a solid body up to a certain pressure and will not flow.

If the field is non-homogeneous only along the direction of flow but is homogeneous over the respective cross sectional area of the through-channel, the flow resistance can vary along an individual flow path, the resistance development, however, is identical for all flow paths within a cross section. This means that no sections (edge layers) can form in the channel. The flow resistance that can be generated by the valve can equally be generated by an absolutely homogeneous field with a corresponding field intensity. Such a valve from the prior art will block completely up to a certain pressure difference and when this pressure difference is exceeded, the fluid will flow in the entire through-channel.

Figure 5:
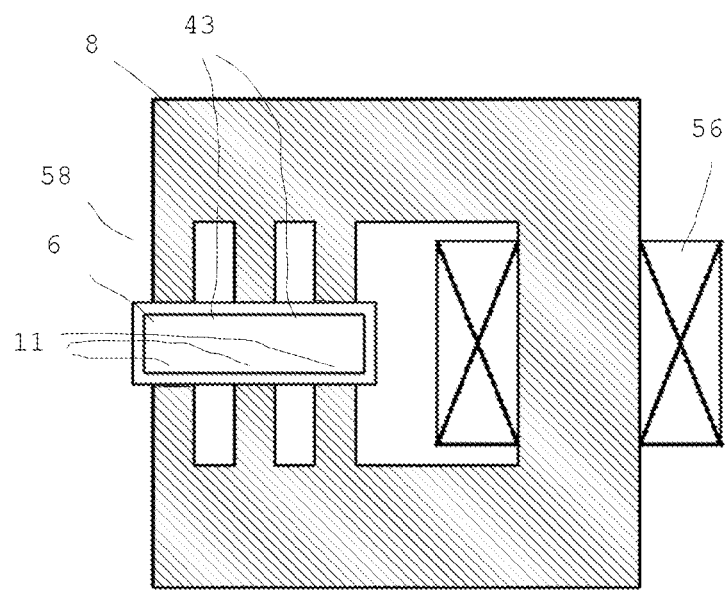
FIG. 5 shows a schematic view of an electric magnetic device with a chamber structure for enlarging the transition region.
Figure 6:
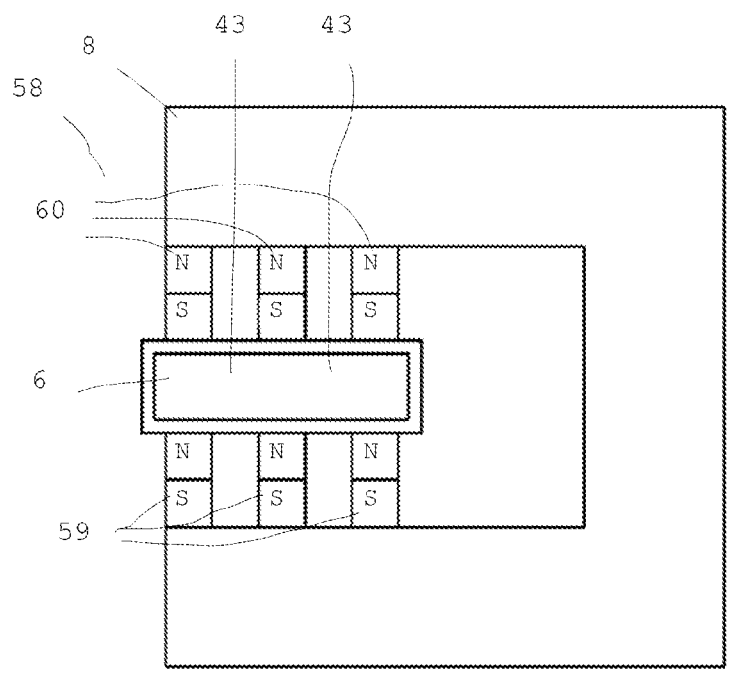
FIG. 6 shows a schematic view of a magnetic device with a chamber structure of permanent magnets for enlarging the transition region.

FIGS. 5 and 6 show the schematic design of a development of the principle as claimed in the invention. A cross section through a valve 4 as claimed in the invention is shown, the direction of flow of the fluid through the valve is transverse and in this case normal to the sectional plane. In this case, the poles 59, 60 are divided into different segments on both sides of the through-channel 6. This means that the magnetic field is focused in the regions of said pole pairs 59, 60 and in the regions in between several transition regions 43 and/or bypass regions 57 are set up, as a result of which their effect can be reinforced.

FIG. 5 shows an electro-coil 56 as the magnetic unit 8 for field generation, in FIG. 6 permanent magnets 8 serve as the magnetic unit. When the permanent magnets as pole pairs 59, 60 abut against the through-channel 6, the stray field is modified in relation to an MRF valve 4 with ferromagnetic pole pairs of the identical shape where the magnetic field is generated in another position of the magnetic unit 8. This behavior can be used for developing the desired compression-speed characteristic of the MRF valve 4.

The polarity of the different segments can be different such that in the case of one pole 59, 60 the magnetic field runs from top to bottom and in the case of the neighboring pole it runs from bottom to top. The shape or field intensities of the various segments can also be different from each other.

Figures 7, 8, 9:
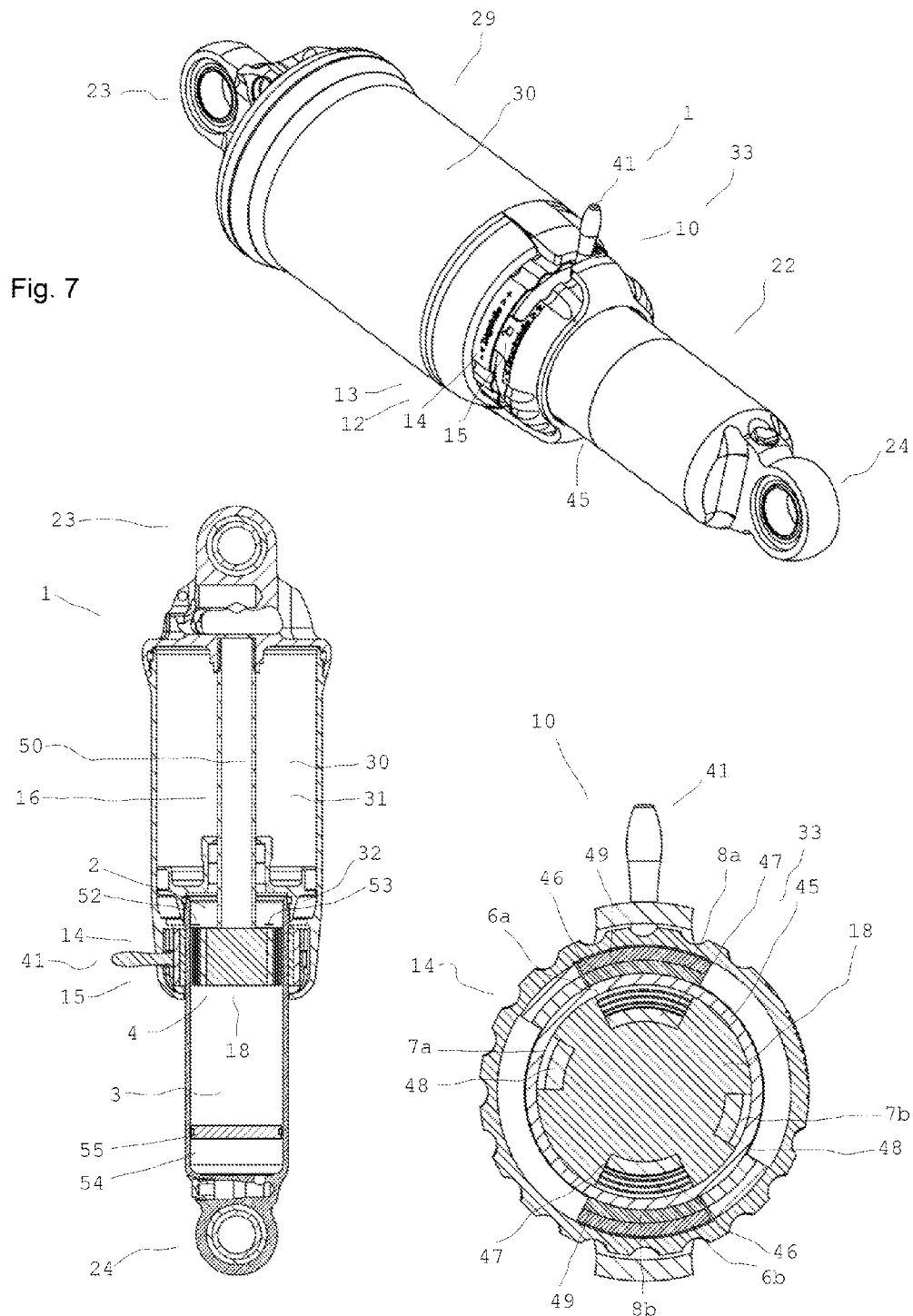
FIG. 7 shows a perspective schematic representation of a bicycle damper with an MRF valve.
FIG. 8 shows a sectioned schematic representation of the bicycle damper with an MRF valve as in FIG. 7.
FIG. 9 shows a cross section through the MRF valve of the bicycle damper as in FIG. 7.

FIGS. 7 to 9 show a design of the MRF valve 4 with a transition region in the form of a damper 1, which can be used, for example, on the rear wheel of a bicycle.

A simple design is made possible. Operation is reliable and the fluid reacts rapidly. An acceptable operating concept is realized, in which the damper 1 has a large adjusting region and the damper characteristic 66 is able to assume an ideal curve shape.

It is also conceivable to develop parts of the adjusting device 10 so as to be exchangeable. Thus the manufacturer is able to adapt the possible adjusting region of the damper 1, for example by means of magnets 8a, 8b of different intensities or rotational rings 14, 15 formed in another manner, without having to carry out changes in the interior of the damper 1.

In the case of a damper as claimed in the prior art, the shim stack in the interior of the damper, for example, has to be changed in order to be able to adapt certain regions (among other things the curvature at the transition from the low speed range 38 to the high speed range 39) to the damper characteristic, for which reason the damper usually has to be completely disassembled.

By means of the exchangeable parts of the adjusting device the same adjustment can be performed in a substantially simpler and quicker manner, possibly even by the specialist supplier or the customers themselves.

A further exemplary embodiment of a damping device 1 with a valve 4 is described below with reference to FIGS. 7 to 9.

The damping device 1 shown in perspective in FIG. 7 includes a damper 22, which in this case includes a first damper chamber 2 and a second damper chamber 3, which are separated from each other by a damping piston 18. A valve 4, which includes flow channels 6 and 7 which serve for damping in the compression stage and in the pulling stage, is provided in the damping piston 18.

In this case both the first damper chamber 2 and the second damper chamber 3 and the flow channels 6 and 7 are filled with a magneto-rheological fluid, which includes magneto-rheological particles, such as, for example, carbonyl iron powder in a carrier fluid. The carrier fluid is preferably based on oil with additives such as stabilizers, antifreezing compounds, abrasion and viscosity improvers. Adjacent to the damper chamber 3 there is a compensating spring 54, which is separated from the damper chamber 3 by means of a separating piston 55.

In this case, the damper device 1 includes a spring device 29, which is realized as a gas spring 30 and is arranged closer to the first end 23, whereas the damper 22 is arranged closer to the second end 24. A piston rod 16 is connected to the damper piston 18 and leads through the gas spring 30. The gas spring 30 includes a first spring chamber 31 and a second spring chamber 32 which are separated by a gas piston.

In this case an adjusting device 10 is provided which includes rotational units 14 and 15 as adjusting elements 12. In this case the rotational unit 14 serves for adjusting the damping in the pulling stage and the rotational unit 15 serves for adjusting the damping in the compression stage. One-way valves 52 and 53 serve for controlling the compression stage and pulling stage in a targeted manner.

In this exemplary embodiment rotational units 14 and 15 of a rotational device 13 are provided as the adjusting device 10. The rotational unit 14 for the pulling stage and the rotational unit 15 for the compression stage are provided here on the outside on the damper housing 45 and have no direct connection to the flow channels 6 and 7. In this case, the magnetic field 44 of the permanent magnets 8a and 8b, accommodated on the rotational units 14 and 15, is effective through the wall of the damper housing 45, which consists of light metal, preferably aluminum or a composite fiber material, onto the flow channels 6 and 7 of the compression stage or pulling stage.

As can be seen in FIG. 8 in a sectioned side view of the bicycle damper 1, the hollow piston rod 16 has an additional spring 50 in the interior, it being possible, where applicable, for said spring to be connected parallel to the gas spring 30. In a development that is not shown, the cutting in of the additional spring 50 can be effected automatically in dependence on the gas temperature, as a result of which the temperature dependence of the spring characteristic is able to be compensated at least in a partial manner. Where required, the additional spring 50 is also able to be manually cut in.

The influencing of the damping is effected at the damper piston 18, on the outside surface of which flow channels 6 and 7 for the compression stage and the pulling stage are provided at predetermined angular spacings.

To increase the capacity and the effect, compartment elements 46 are provided in the flow channel 6 for the compression stage, said compartment elements being arranged substantially concentrically with respect to the outside wall of the damper 22 and resulting in a strengthening of the effect of the magnetic field 44. The compartment elements 46 divide the flow channel 6 into several individual damping gaps 6a, 6b.

Chains are formed in the magneto-rheological fluid along the flux lines of the magnetic field 44, as a result of which passage through the flow channels 6, 7, which are provided with the compartment elements 46, is made more difficult. The maximum effect is achieved when the flux lines extend in a normal manner onto the surface of the compartment elements 46.

The compartment elements 46 are preferably produced from ferromagnetic material in order not to load the magnetic circuit by an additional "air gap". Depending on the desired transition region, it can be advantageous to use a material with a specific magnetic saturation. For example, a steel alloy with a magnetic saturation of 1.6 Tesla is provided in the damper as shown in FIG. 7.

In order to be able to adjust specific characteristics of the bicycle damper 1, however, compartments produced from permanent magnets or even compartments produced from non-magnetically conducting material are conceivable.

Magnetic conductors 47 and 48, which serve to divert the magnetic field that is acting on flow channels 6 and 7, are provided on the damper piston 18 radially inside the flow channels 6 and 7.

The form of the magnetic conductors 47, 48 is oriented to the development of the magnetic circuit. A variant where the magnet 8a, 8b is divided into two along the direction of flow is shown in this case: one pole pair generates flux lines in the direction of the piston 18 towards the inner magnetic conductors 47, 48, the second pole pair generates flux lines in the direction of the outer magnetic conductor 49. The magnetic circuit is closed by the magnetic conductors 47, 48, 49 in the direction of flow.

A particle which flows through a flow path of the damper is magnetized, for example, along its path first of all by flux lines that extend substantially radially outward and in the region of the middle of the piston it runs through a weaker field, which can also extend parallel to the flow path. In the rear region of its flow path, the flux lines extend radially inward again, as a result of which the particle is magnetized in a reverse polarized manner.

If the damping piston 18 is produced from ferromagnetic material, the magnetic conductors 47, 48 can be omitted.

A control lever 41 can serve for adjustment. However, it is also possible to grasp and rotate the rotational units 14 and 15, realized as rotational rings, directly or they can be activated by means of a Bowden cable.

In a further variant, the change of the damping adjustment takes place by way of the control lever 41, it being possible to pre-set the damping by means of the rotational units 14, 15.

In the first position 33 shown in FIG. 9, the damping gaps 6a and 6b are exposed to the maximum magnetic field for the compression stage, whilst the damping gaps 7a and 7b of the flow channel 7 of the pulling stage are essentially not exposed to a magnetic field.

If the control lever 41 is rotated clockwise by a certain angle in relation to the position in FIG. 9 until half of the damping gaps 6a and 6b of the flow channel 6 are exposed in each case to the magnetic field of the permanent magnets 8a and 8b, whilst the other half of the damping gaps 6a and 6b are substantially free of a magnetic field, there is average damping of the compression stage and low damping of the pulling stage.

The magnetic field, which is non-homogeneous in the direction of flow in the case of this variant of magnetization, can also become non-homogeneous along the shown sectional plane by rotating the magnets.

In an analogous manner to the compression stage, the magnets and the magnetic conductors of the pulling stage can be adjusted independently of the compression stage and the damping of the pulling stage can be varied in this manner. Control can be realized, for example, by means of the rotational unit 14.

In the representation shown in FIG. 9, the flow channels are traversed in a normal manner with respect to the drawing plane. By rotating the magnets, a non-homogeneous magnetic field can be built-up in the flow channels along the shown sectional plane. When viewed in the direction of flow, regions without a magnetic field or with only a weak magnetic field and regions radially below the magnets with a very strong magnetic field can be generated in this manner. A transition region in which the magnetic field has a gradient from the weak field region to the strong field region lies in between the abovementioned regions.

This means that the flow resistance of individual flow paths can differ clearly from the resistance of other flow paths that extend in the same flow channel. Depending on the region in which a flow path traverses a flow channel, it experiences a different flow resistance. Depending on the pressure difference and field intensity, it is possible for only a part region of the cross sectional area of a flow channel shown to be traversed.

The design shown with magnetization in the axial direction, that is to say along the direction of flow, can generate an additional magnetic field that is non-homogeneous in the direction of flow. However, this does not influence the aforedescribed effect as this is based on a non-homogeneous field along the channel cross section. The damping channel can be divided into different regions by rotating the magnets even with a magnetic field that is completely uniform in the direction of flow.

It is also possible to position the rotational rings 14, 15 in an eccentric manner with respect to the damping axis and to provide only one flow channel with or without compartment elements in each case for the compression stage and for the pulling stage, such that, when said rings are rotated, the distance between the permanent magnet and the damping gap, and consequently the density of the magnetic flux in the magneto-rheological fluid, also alters.

In a further design variant (not shown), it could also be possible, in place of permanent magnets, to rotate or displace in an axial manner shielding elements which can influence the magnetic flux through the damping channels and can enlarge the transition region.

Figure 10:
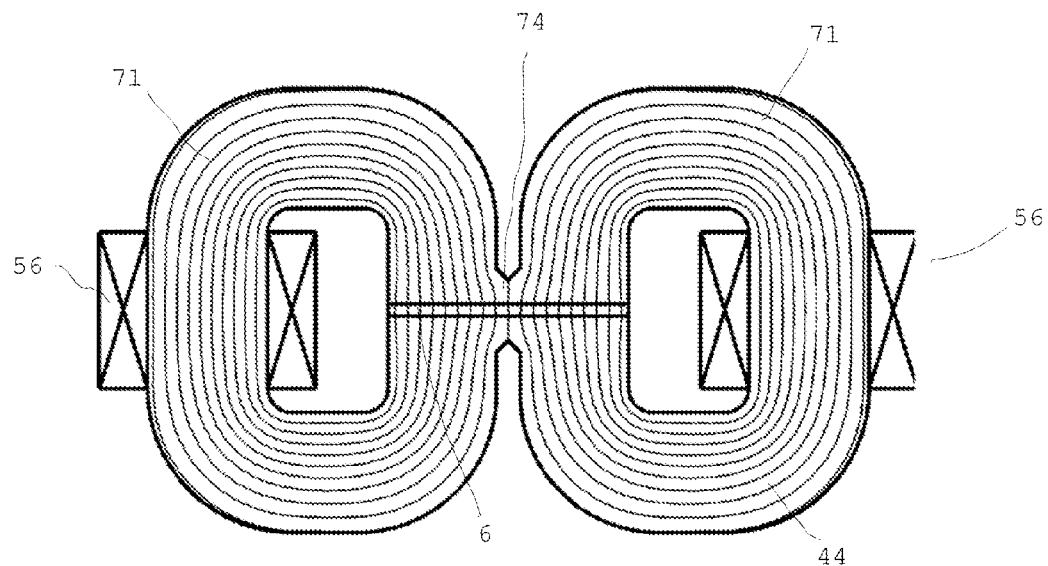
FIG. 10 shows a schematic view of a magnetic device with two electromagnets.
Figure 11:
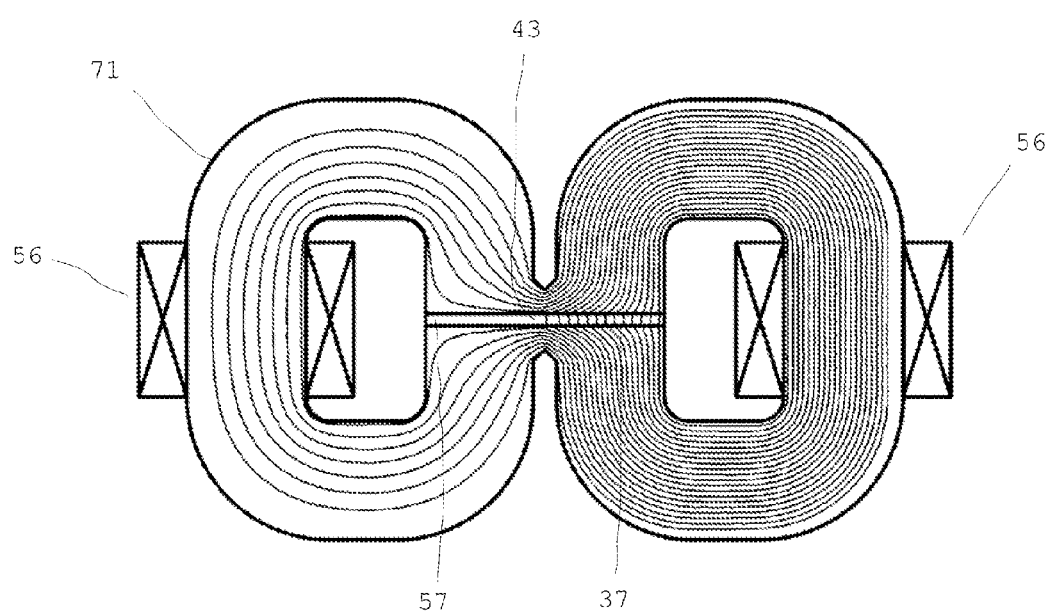
FIG. 11 shows a schematic view of the magnetic device as in FIG. 10 in another operating state.

FIGS. 10 and 11 show a further exemplary embodiment in a strongly schematic manner. In this case, the iron core 71 forms approximately the shape of an "8" with two approximately O-shaped part regions which are connected together to form an "8". The flow channel 6, which can be acted upon by a magnetic field produced from electric coils 56, is provided on the connecting web 74. The direction of flow through the flow channel is perpendicular to the drawing plane. A cross section through a schematic valve is shown in order to be able to show the method of operation in a better manner.

When both coils 56 generate an identical field 44, as shown in FIG. 10, the flow channel 6 is acted upon in a substantially homogeneous manner. The flow channel 6 blocks or shows a compression-speed development as shown in FIG. 1.

When both coils 56 generate different fields 44, as shown in FIG. 11, approximately half of the flow channel 6 is blocked by a blocking section 37, whilst a further section is exposed to practically no field and forms a transmission or bypass section 57. The central region is a transition region 43 with a strongly non-homogeneous magnetic field. Said transition region 43 is responsible for the curvature or rounding 61 of the characteristic 66.

The different regions of blocking section, transmission section and transition region are part regions of the cross sectional area of the flow channel. Each region runs through the valve along the direction of flow. The volume portion of the flow channel which opposes the flow by a certain resistance is able to be adjusted over the surface portion of the individual regions on the entire cross section of the flow channel. For example, the transmission section defines the volume portion of the flow channel which is field-free or is traversed only by a relatively weak magnetic field.

Other patterns can be generated by means of other field intensities. Arbitrary magnetic fields can be generated with a corresponding number of electric coils.

Figure 12:
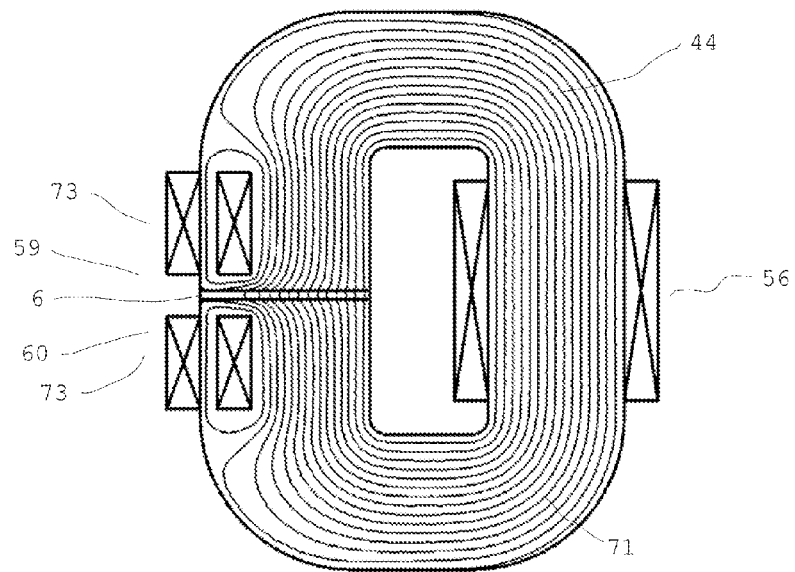
FIG. 12 shows a further schematic view of a magnetic device.

In FIG. 12 a C-shaped iron core 71 is provided with a main coil 56, whilst smaller control coils 73 are provided at the poles 59, 60 of the C in order to adapt the characteristic in a corresponding manner.

In all cases, the walls (covering) of the flow channel 6 traversed by the magnetic field or elements lying between the magnetic unit 8 and the flow channel 6 can be constructed from materials that are magnetically conducting in a varying manner up to and including materials that are not magnetically conducting, as a result of which regions of different field intensities are able to be set in the flow channel 6 (blocking region 37, transition region 43, transmission or bypass region 57). For example, a partial covering of the flow channel 6 produced from material that is not magnetically conducting (plastics material, high-grade steel, etc.) makes penetrating the magnetic flux lines in this region more difficult, as a result of which a bypass region 43 is produced. This region can preferably be selected in the middle of the flow channel 6, as a result of which several transition regions 43—such as for chamber-like elements 58—are set up.

Elements shielding the magnetic field, elements diverting the magnetic field and structures increasing surface friction (compartment elements) installed in the flow channel 6 and produced from different material provide the identical effect.

The surface of the flow channel 6 does not have to be even.

The flow channel 6 can have heightening structures.

The flow channel 6 does not have to be rectangular, it can have any arbitrary form.

Figure 13:
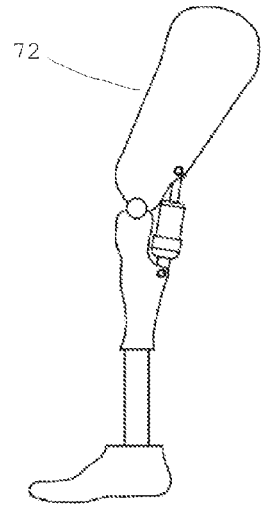
FIG. 13 shows a schematic view of a damper with an MRF valve on an artificial knee joint.

FIG. 13 shows a further possible application of this invention used as a damper in the case of a leg prosthesis 72. In the case of this application too, a flowing force transition is necessary as the non-harmonic movement sequence could lead to stumbling and consequently greatly restrict the wearing comfort.

Figure 14:
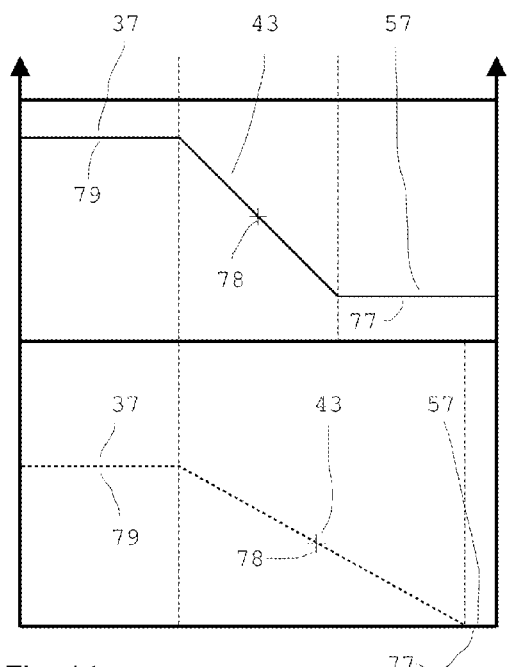
FIG. 14 shows a schematic representation of two developments of the field intensity over the cross section of the through-channel.

FIG. 14 is a schematic representation of two developments of the field intensity over the cross section of the flow channel 6. The development of the field intensity is represented in a strongly schematic manner in a first set-up in the upper half.

An approximately homogeneous field, which has a first average value 77, is present in the transmission section 57. The field is strongly non-homogeneous in the transition region 43 and has a strong gradient. In the transition region 43, the field has a considerably larger second average value 78. The development of the field intensity over the blocking section 37 is approximately constantly high and has a third average value 79. The surface portion of the blocking section 37, in this case, is approximately a third, just as also the surface portion of the transition region 43 and that of the transmission section 57. The respective surface portion and the field prevailing there in each case depend on the current set-up conditions in each case. In particular, fluctuations of the field intensity in space and/or time can also be present in the blocking section 37 and in the transmission section 57. In the bottom half of FIG. 14, the development of the field over the cross section of the flow channel is shown with other settings. Once again, the surface portion of the blocking section 37 here is approximately a third. The transition region 43 is considerably larger and the transmission section 57 correspondingly smaller. The average values 77, 78 and 79 are correspondingly adapted, the third average value 79 not having to be altered. This representation shows that the field is strongly non-homogeneous over the flow channel. The size of each component part or section can be adjustable such that the valve characteristics are able to be adapted in a simple manner.

The schematically represented development of the field intensity shows a linear development in all regions, transmission section 57 and blocking section 37 are connected in the transition region 43 by a straight line. The present application is expressly applicable to arbitrary field developments, the described adjusting procedure by adapting the portions of the cross sectional area is also applicable in an analogous manner to non-linear developments.

The invention provides a valve 4 (MRF or ERF) with a transition region 43, the valve 4 having in particular at least one adjustable or settable transition region 43. The transition region is a part surface of the cross sectional area of a flow channel 6 and is generated by a field that is non-homogeneous transversely to the direction of flow.

It enables arbitrary characteristics to be reproduced without using mechanical elements (springs etc.) or requiring expensive real time control.

Linear or rotational elements can be provided for adjusting. Adjusting is possible through a wall with no direct mechanical contact. However, adjusting can also take place only by means of electric current by means of a coil, combinations of coils, permanent magnets and electric or mechanical adjusting also being conceivable.

The magnetic field 44 can be generated by means of a coil 56 or a permanent magnet 8a, 8b. Pole pairs 59, 60 with a chamber-like structure 58 can be used to alter (enlarge and/or reduce) the transition region. For example, an adjustable magnet can have several gaps (poles) which allow the transition regions 43 to be generated in the magnetic field.

The intensity of the magnetic field 44 can be adjusted by varying the distance between gaps (distance between the magnetic device and the flow channel). However, it is possible to connect an additional magnet, for example, which intensifies the magnetic field.

It is also conceivable to weaken the field in a partial or complete manner by means of magnetic short circuits outside the channel section to be influenced by moving magnetically conducting material between the magnetic device 8 and the through-channel 6. It is equally possible for at least part regions of the magnetic field to be weakened when the "air gap" in the magnetic field is enlarged by material that is not magnetically conducting.

It is also possible to alter the field intensity by modifying the ferromagnetic pole pieces which close the magnetic circuit outside the through-channel. It is possible to influence the entire magnetic flux by the form and the saturation field intensity of the material.

The valve 4 can be used for the damping process in dampers 22. The use of electro-rheological or magneto-rheological fluids ensures that the channel traversed by these fluids is subject to different strength field intensities in the transverse direction through the channel.

The flow resistance of the valve 4, which is adjustable by means of an adjusting device 10, lasts permanently until the adjusting device 10 is activated once again. The design with at least one electric coil 56 provides many advantages compared to adjusting the adjusting device in a mechanical manner, such as, for example, rapid and fully automatic adaptation by a control unit, but requires power during the entire duration of the change from the currentless basic state of the valve 4. Precisely in the case of a mobile application such as, for example, a shock absorber for a bicycle, a permanent energy requirement of the electric design can be disadvantageous.

One advantageous solution is provided by a further design of the valve as claimed in the invention, in that the magnetic field can be generated permanently by a magnetic device 8 which consists at least in a partial manner of magnetically hard material. In this case, the magnetization of the magnetically hard material is changeable permanently by means of at least one magnetic pulse of at least one coil in order to modify in a permanent manner the magnetic field that is effective in the control channel and consequently the flow resistance of the valve.

Contrary to the prior art, where the magnetic field of the magnet is able to be changed by the magnetic field of the coil only as long as current flows in the coil, a valve as claimed in the invention is able to alter the magnetization of the magnetic device in a permanent manner by means of magnetic pulses of the coil. This means that, for example, by means of one individual short pulse, which only requires energy briefly, the magnetic properties of the magnetic device can be altered in a permanent manner. Energy, therefore, is only required to change the field intensity in the control channel.

The magnetic field generated by the magnetic device in the control channel is effective without an energy supply and retains its field intensity in a permanent manner as long as it is not influenced by correspondingly strong external circumstances such as, for example, other magnetic fields, temperature influences or natural aging processes.

With at least one pulse from at least one coil, the permanent magnetization of the magnetic device is able to be altered, as a result of which the form and intensity of the magnetic field in the flow channel can be altered in a permanent manner without any further energy supply. For example, the magnetic device can be magnetized by means of a pulse from two coils that differs in strength in such a manner that said magnetic device can generate a field that is non-homogeneous transversely to the direction of flow in a permanent manner.

The permanent magnetization of the magnetically hard material is preferably adjustable to an arbitrary value between zero and the remanence by at least one magnetic pulse from the coil. In this case, the polarity of the magnetization can preferably also be changeable. This static magnetic field is able to be overlaid by a dynamic magnetic field by means of the coil without thereby changing the permanent magnetization of the magnetically hard material.

The term permanent within the meaning of this application refers to a period which is longer by a multiple than the duration of the magnetic pulse. In particular, it means periods of at least several seconds, minutes, hours, days or longer. However, the magnetization set does not have to remain exclusively identical forever as it can be subject to natural fluctuations and weakening phenomena. Contrary to this, the duration of the magnetic pulse required for the change is relatively short. The duration of the, in particular, single short-time pulse, in this case, is preferably less than 1 minute, preferably less than 1 second and, in particular, less than 10 milliseconds. The intensity of the magnetization depends on the intensity of the magnetic pulse, but not on the length of the magnetic pulse.

A material is said to be magnetically hard when its coercive field strength is in excess of 1 kA/m and, in particular, in excess of 10 kA/m. In a preferred manner, the magnetically hard material has a coercive field strength that is less than 1500 kA/m, is preferably less than 500 kA/m and in a particularly preferred manner is less than 200 kA/m. For example, alnico or a magnetic steel alloy such as, for example, FeCrCo, FeCoVCr and CuNiFe or another material with comparable magnetic properties is suitable as the material. The advantage of AlNiCo is the development of the demagnetization curve, the high temperature stability and the good chemical properties in relation to other conventional magnetic materials.

The magnetically hard material, on the one hand, has to be able to generate a high magnetic field intensity in the existing magnetic circuit, and, on the other hand, the energy necessary for demagnetization must not be too large. It is conceivable to produce only part of the magnetic device from magnetically hard material and the rest from a material with low magnetic resistance (reluctance) and high saturation flux density. In an advantageous manner, this part of the magnetic device is arranged in the coil or in the direct vicinity thereof, as there the coil field is at its strongest for demagnetization and can also be controlled best.

However, it is also possible to produce the entire magnetic device from magnetically hard material, comparatively more material being available then for generating the field or the magnetic demands on the material becoming smaller. The generatable field strength of the coil is preferably sufficient to magnetize the magnetically hard parts of the magnetic device up to and including the magnetic saturation thereof.

At least one capacitor device and at least one energy storage means, in particular a battery, are preferably provided in order to provide the energy to generate at least one magnetic pulse. This means that the valve also has excellent emergency running properties if, for example, the energy supply breaks down or the control system fails. A defined operating state of the valve can be ensured by a defined current pulse.

At least one control and/or checking device is preferably provided in all the developments in order to output magnetic pulses of the coil in a controlled and/or regulated manner.

At least one sensor device can be provided to measure the actual data and/or the position of the valve. Sensors can be used for direct or indirect determining of the magnetization of the magnetic device. These sensors or the measured results thereof can be used by a controlling or regulating device to determine the strength of the magnetic pulses to be generated.

At least one resonant circuit is preferably to be provided in order to be able to generate a damped magnetic alternating field for demagnetization. The demagnetization of the magnetically hard material can be effected by means of a damped magnetic alternating field or at least one defined magnetic pulse. It is possible prior to each change in the magnetization to demagnetize the magnetic device initially and then to remagnetize it again.

LIST OF REFERENCES

1 Damper device
2,3 Damper chamber
4 Flow valve
6 Flow channel, transmission channel
6a,6b Damping gap for the compression stage
7 Flow channel, transmission channel
7a,7b Damping gap for the pulling stage
7 Magnetic device, field generating device
8a,8b Permanent magnet
8 Magneto-rheological fluid
9 Adjusting device
10 Portion, surface portion, volume portion
11 Adjusting element
12 Rotational device
13 Rotational unit for the pulling stage
14 Rotational unit for the compression stage
15 Piston rod
18 Damping piston
22 Damper
23 First end
24 Second end
29 Spring device
30 Gas spring
31,32 Spring chamber
33 First position
37 Blocking section, operative section
38 Low speed range
39 High speed range
40 Break point
41 Control lever
43 Transition region
44 Magnetic field
45 Damper housing
46 Compartment element
47,48,49 Magnetic conductor
50 Additional spring
52,53 One-way valve
54 Compensation spring
55 Separating piston
56 Electric coil
57 Transmission section
58 Chamber section, chamber structure
59,60 Poles
61 Rounding
62 Radius
63,64 Ascent
66,66a,66b Damper characteristic
71 Iron core
72 Leg prosthesis
73 Control coil
74 Connecting web
77 First average value
78 Second average value
79 Third average value

The invention claimed is:

1. A valve device, comprising:
a valve formed with a through-channel and a field generating device;
a fluid to be conducted along a flow direction and to be influenced by a field in said through-channel, said field generating device being configured to act on said fluid by way of a field in said through-channel; and
at least one adjusting device configured to adjust the field that is effective in said through-channel;
wherein said at least one adjusting device is configured to adjust the field in said through-channel with different intensities in different regions of said through-channel and with a virtual division of said through-channel, transversely with respect to a direction of flow, with at least three zones of mutually different field intensity, the at least three zones including:
a transmission section with lesser field intensity;
a blocking section with higher field intensity; and
a transition region connecting said transmission section and said blocking section with a field that is non-homogeneous transversely with respect to a channel cross section; and
wherein a portion of said through channel that is exposed to a partial field, defining the transition region from a weakest to a strongest field, is an adjustable and modifiable portion; and
wherein said at least one adjusting device is configured to adjust and modify the transition region by varying the field that is effective in said through-channel.

2. The valve device according to claim 1, wherein said blocking section merges into said transition region or said transmission section merges into said transition region.

3. The valve device according to claim 2, wherein at least one portion of a cross sectional area of said through-channel is adjustable, said at least one portion being exposed to a field of a specific intensity so as to enable said through-channel to be exposed in only a partial manner to a field of a specific intensity.

4. The valve device according to claim 2, wherein said adjusting device is configured to adjust one or both of a surface portion of the cross sectional area or a volume portion of said through-channel on which a field of a specific intensity acts.

5. The valve device according to claim 1, wherein at least one of a form of the field or an intensity of the field acting on said through-channel is adjustable.

6. The valve device according to claim 1, wherein said adjusting device includes at least one longitudinally displaceable adjusting element.

7. The valve device according to claim 1, wherein said adjusting device includes at least one rotational device.

8. The valve device according to claim 1, which further comprises at least one control valve.

9. The valve device according to claim 1, wherein an adjustment of said through-channel is effected only via the field without direct mechanical contact.

10. The valve device according to claim 1, wherein said valve is housed in a valve housing, the field is a magnetic field, and the field is effective through said valve housing.

11. The valve device according to claim 1, wherein a portion of said through-channel exposed to a partial field, formed by a transition region from a weakest field to a strongest field, is modifiable.

12. The valve device according to claim 1, wherein said field generating device is a magnetic device, and wherein a plurality of transition regions or bypass regions can be generated in said through-channel by way of a plurality of pole pairs of said magnetic device.

13. The valve device according to claim 1, wherein said field generating device is a magnetic device configured for generating a magnetic field and comprising at least one of at least one current-carrying coil or at least one permanent magnet.

14. The valve device according to claim 1, wherein said field device is a magnetic device and at least part of said magnetic device has, at least partially, magnetically hard properties, wherein a material is magnetically hard when a coercive field strength thereof is in excess of 1000 amperes/meter (1 kA/m).

15. The valve device according to claim 14, wherein a magnetization of said magnetic device can be permanently modified by at least one magnetic pulse of at least one coil.

16. The valve device according to claim 14, wherein a magnetization of said magnetic device can be completely eliminated, or at least weakened, by a magnetic alternating field of at least one coil.

17. The valve device according to claim 14, wherein a magnetization of said magnetic device, by way of at least one magnetic pulse of at least one coil, can take on, in a permanent manner, a form defined by the pulse at magnetization intensities of between zero and a remanence of the material and with arbitrary polarity.

18. The valve device according to claim 1, which comprises an energy storage device configured to store an energy for at least one magnetic pulse of said coil.

19. A valve device, comprising:
- a valve formed with a through-channel and a magnetic field generating device;
- a magneto-rheological fluid to be conducted along a flow direction and to be influenced by a magnetic field in said through-channel, said field generating device being configured to act on said fluid by way of a magnetic field in said through-channel; and
- at least one adjusting device configured to adjust the magnetic field that is effective in said through-channel;
- wherein said through-channel and said field generating device are configured to adjust the magnetic field in said through channel with a virtual division, transversely with respect to a direction of flow, into a plurality of zones with respectively different magnetic field intensities, the zones including:
  - a transmission section with lesser field intensity;
  - a blocking section with higher field intensity; and
  - a transition region connecting said transmission section and said blocking section with a field that is non-homogeneous transversely with respect to a channel cross section; and
- wherein said plurality of zones are contiguous within said through channel and without a separation by mechanical boundaries, and wherein the magnetic field in said transition region from a weakest to a strongest magnetic field, is a modifiable portion; and
- wherein said at least one adjusting device is configured to adjust and modify the transition region by varying the magnetic field that is effective in said through-channel.

* * * * *